(12) United States Patent
Miu et al.

(10) Patent No.: US 9,815,341 B2
(45) Date of Patent: Nov. 14, 2017

(54) AUTOMATIC TRUCK ASSEMBLY TIRE INFLATOR SYSTEM WITH DUAL PUMP

(71) Applicant: Magna Closures Inc., Newmarket (CA)

(72) Inventors: Traian Miu, Oakville (CA); J. R. Scott Mitchell, Newmarket (CA); Gabriele Wayne Sabatini, Keswick (CA); Todd Deaville, Markham (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 15/032,188

(22) PCT Filed: Nov. 5, 2014

(86) PCT No.: PCT/CA2014/000791
§ 371 (c)(1),
(2) Date: Apr. 26, 2016

(87) PCT Pub. No.: WO2015/066792
PCT Pub. Date: May 14, 2015

(65) Prior Publication Data
US 2016/0263949 A1    Sep. 15, 2016

Related U.S. Application Data

(60) Provisional application No. 61/900,103, filed on Nov. 5, 2013.

(51) Int. Cl.
*B60B 23/00* (2006.01)
*B60B 23/12* (2006.01)
(Continued)

(52) U.S. Cl.
CPC .......... *B60C 23/004* (2013.01); *B60C 23/007* (2013.01); *B60C 23/12* (2013.01);
(Continued)

(58) Field of Classification Search
CPC ..... B60C 23/004; B60C 23/007; B60C 23/12; F04B 35/00; F04B 35/01; F04B 35/06; F04B 39/0022; F04B 39/121; F04B 41/06
See application file for complete search history.

(56) References Cited

U.S. PATENT DOCUMENTS 2,256,469 A *  9/1941  Parker ................... B60C 23/007
                                                    152/418
2,317,636 A *  4/1943  Parker ..................... B60C 23/12
                                                    152/418
(Continued)

FOREIGN PATENT DOCUMENTS

GB          667269 A *  2/1952  ............. B60C 23/12
WO    WO2014009822 A1   1/2014

OTHER PUBLICATIONS

International Search Report dated Feb. 3, 2015 in International Patent Application No. PCT/CA2014/000791.

*Primary Examiner* — Kip T Kotter
(74) *Attorney, Agent, or Firm* — Dickinson Wright PLLC

(57) ABSTRACT

A tire inflation apparatuses is provided for maintaining a predetermined inflation pressure of a pair of tires mounted a dual wheel unit of a vehicle. The apparatus includes a first and a second pump unit that are connected to a housing that includes a mounting structure for engaging a complementary mounting structure of the dual wheel unit. The first and second pump include first and second pump rods configured to translate in response to rotation of the dual wheel unit. A gearset and an eccentric drive mechanism are arranged to reciprocate the first and second pump rods.

20 Claims, 9 Drawing Sheets

(51) Int. Cl.
*F04B 35/01* (2006.01)
*F04B 35/06* (2006.01)
*F04B 41/06* (2006.01)
*F04B 39/12* (2006.01)
*F04B 35/00* (2006.01)
*F04B 39/00* (2006.01)
*B60C 23/00* (2006.01)
*B60C 23/12* (2006.01)

(52) U.S. Cl.
CPC .............. *F04B 35/00* (2013.01); *F04B 35/01* (2013.01); *F04B 35/06* (2013.01); *F04B 39/0022* (2013.01); *F04B 39/121* (2013.01); *F04B 41/06* (2013.01)

(56) References Cited

U.S. PATENT DOCUMENTS

| | | | |
|---|---|---|---|
| 5,975,174 A | 11/1999 | Loewe | |
| 7,013,931 B2 | 3/2006 | Toit | |
| 8,435,012 B2* | 5/2013 | Clinciu | F04B 35/01 |
| | | | 152/418 |
| 2011/0129360 A1 | 6/2011 | Clinciu | |
| 2012/0024445 A1* | 2/2012 | Wilson | B60C 23/003 |
| | | | 152/415 |
| 2012/0186714 A1* | 7/2012 | Richardson | B60C 23/12 |
| | | | 152/419 |
| 2013/0146193 A1* | 6/2013 | Stephenson | B60C 23/007 |
| | | | 152/415 |
| 2013/0251553 A1* | 9/2013 | Richardson | F04C 25/00 |
| | | | 417/321 |

* cited by examiner

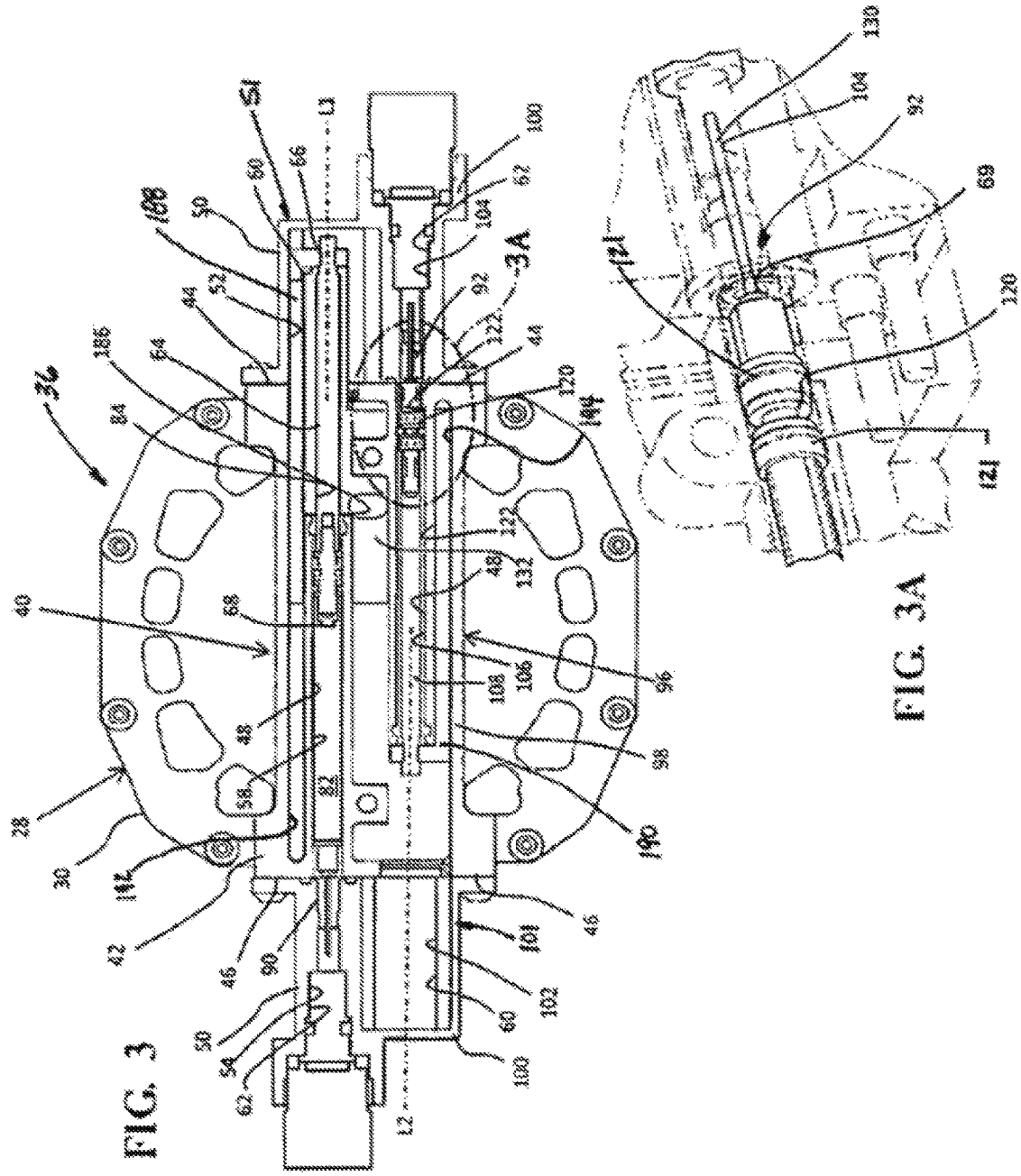

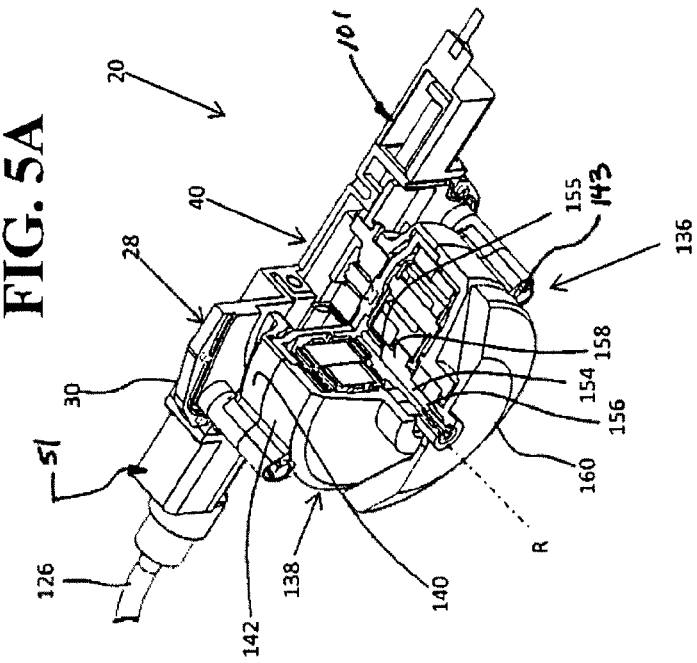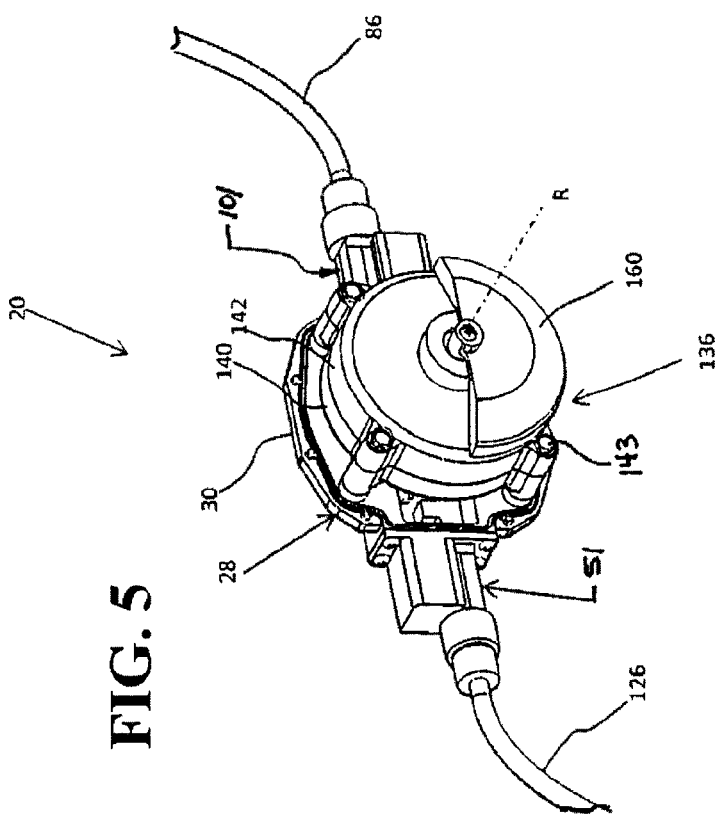

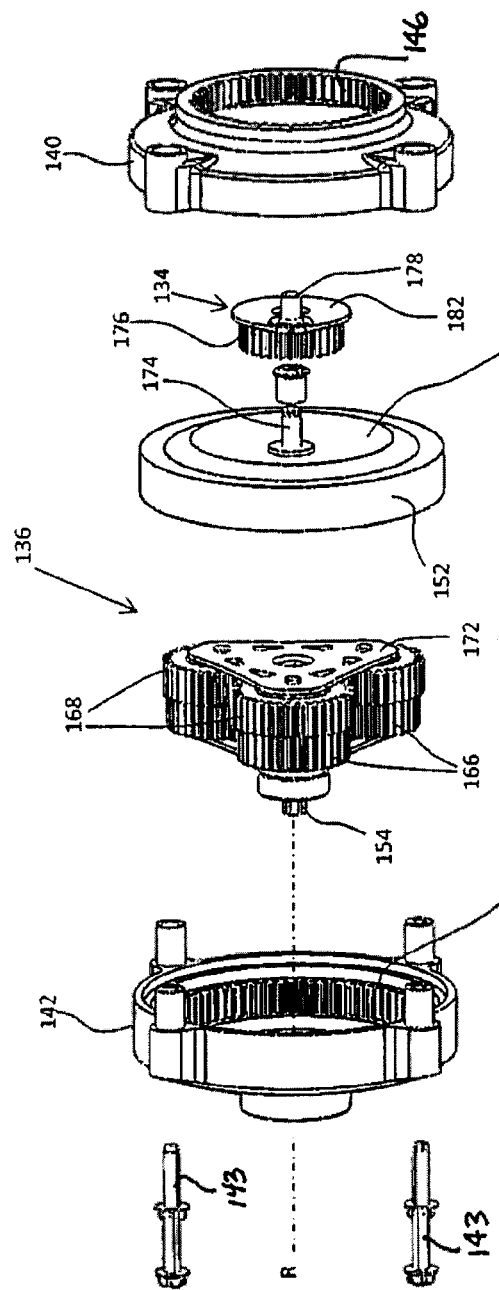
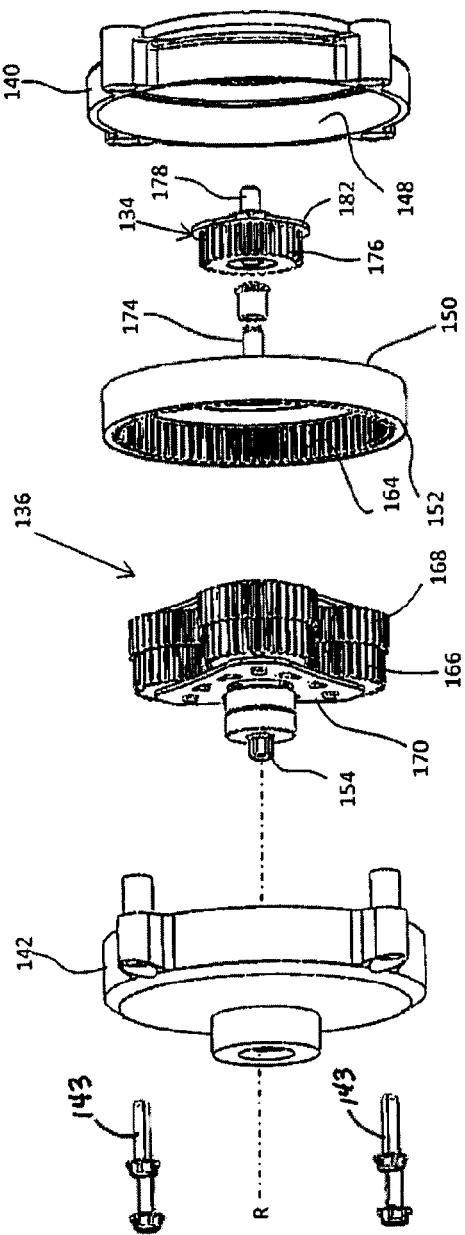
FIG. 7A
FIG. 7B

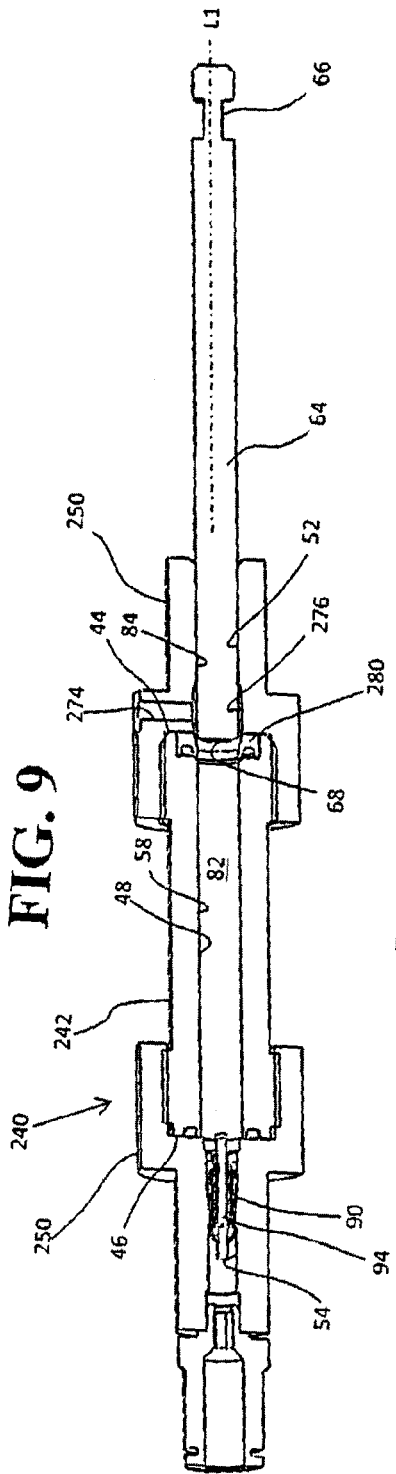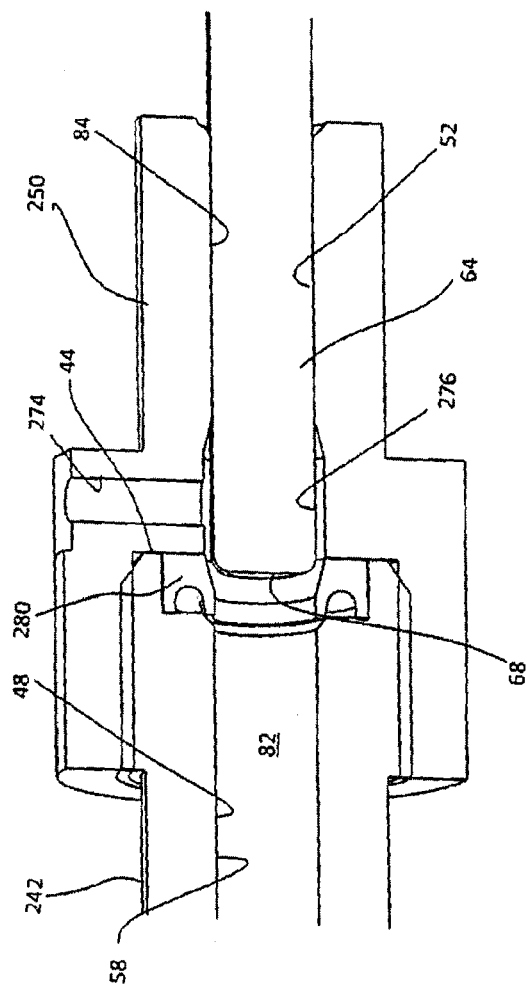
FIG. 9
FIG. 9A

AUTOMATIC TRUCK ASSEMBLY TIRE INFLATOR SYSTEM WITH DUAL PUMP

CROSS REFERENCE TO RELATED APPLICATION

This application claims priority to and the benefit of U.S. Provisional Patent Application Ser. No. 61/900,103 filed Nov. 5, 2013, entitled "AUTOMATIC TRUCK TIRE INFLATOR SYSTEM WITH DUAL PUMP". The entire disclosure of the above application is incorporated herein by reference.

BACKGROUND

1. Field of the Invention

The present disclosure relates generally to a fluid pressure control apparatus and, more particularly, to an automatic tire inflation device that is mounted on a dual wheel unit of a vehicle for maintaining a desired inflation pressure within a pair of tires mounted on the dual wheel unit.

2. Related Art

This section provides background information related to the present disclosure which is not necessarily prior art.

Maintaining correct inflation pressure in vehicle tires is known to be an effective way to increase fuel economy, decrease tire wear and increase safety. Optimum fuel economy results when vehicle tires are inflated to the proper pressure where the rolling resistance of the tire is minimized. Tire over-inflation causes excessive wear near the middle of the tire's tread due to the tire bulging outward. On the other hand, under-inflation results in excessive wear at the edges of the tire's tread as the tire flattens. It is estimated that improper tire inflation results in billions of dollars of unnecessary tire wear each year in the United States, as well as increasing fuel consumption by about 3% and producing an additional 1400 kilograms of $CO_2$ emissions per vehicle.

An automobile tire may lose one to two psi of pressure per month in cool weather and more in warmer weather. Additionally, tire pressure varies with the temperature of air in the tire and is consequently affected by vehicle speed, road surface, ambient temperature, etc. Although proper tire inflation may be maintained by regularly checking tire pressure and adjusting accordingly, such maintenance tends to be largely ignored because of the inconvenience that is involved.

A number of systems are known for automatically maintaining tire inflation pressure during the operation of a motorized vehicle. These known systems may be grouped into two broad categories: centralized systems and on-wheel systems. Centralized systems are installed typically on commercial vehicles, such as for instance tractor trailers, and they feed air from a central air tank or compressor to each of the vehicles rotating tires via rotary pneumatic joints and seals. Of course, the use of such rotary seals involves several inherent disadvantages. For instance, installation and maintenance are complex and costly. Further, such rotary joints and seals are necessarily operated in an environment that is inherently hostile to their performance. As such, centralized systems for automatically maintaining tire inflation are not generally considered to be a practical solution for use in automobiles, with the exception of a few high-end luxury brands.

Various on-wheel (or in-wheel) systems are also known. In these systems, a separate inflation mechanism is carried on each wheel of the vehicle such that the pressure of each tire is adjusted using a mechanism that is mounted to the same wheel to which the tire is mounted. Tire deformation-based systems, such as the one disclosed in U.S. Pat. No. 5,975,174, may include a compressor disposed inside the tire and a plunger for converting deformation of the rotating tire into a linear force for driving a piston of the compressor. Of course, the mechanism is not user-serviceable and is generally inaccessible, requiring the tire to be removed each time maintenance is performed. Alternatively, a wheel-mounted, centrifugally activated air compressor for adjusting tire pressure is disclosed in U.S. Patent Application Publication No. 2011/0129360. The system disclosed uses a plurality of pistons and spring-biased centrifugal arms to adjust the pressure of each tire. Not only is the system overly complicated, it is also susceptible to mechanical failure under the harsh operating conditions typically found in the vicinity of vehicle wheels.

Accordingly, it would be advantageous to provide a tire inflation apparatus that overcomes at least some of the above-mentioned limitations of the prior art. Further, it would be advantageous to provide a tire inflation apparatus that can be used on dual wheel units of vehicles.

SUMMARY

This section provides a general summary of the present disclosure and is not a comprehensive disclosure of its full scope or all of its features, aspects and objectives.

It is an aspect of the present disclosure to provide a tire inflation apparatus that can simultaneously inflate both tires of a dual wheel unit of an automobile.

It is another aspect of the present disclosure to provide a tire inflation apparatus that provides for reduced cyclical wear of the pump components while increasing the stroke force of the pump components.

It is another aspect of the present disclosure to provide a tire inflation apparatus that is configured to apply an equal force against a first pump rod and a second pump rod during linear movement of the first and second pump rods for inflating the tires.

It is another aspect of the present disclosure to provide an inflation apparatus that is configured to reduce complexity and promote extended service life.

According to another aspect of the present disclosure, a tire inflation apparatus is provided for maintaining a predetermined inflation in a pair of tires, each of which is mounted on a dual wheel unit of a vehicle. The tire inflation apparatus includes a dual pump assembly adapted to be mounted for rotation with a first wheel of the dual wheel unit and having a first piston pump and a second piston pump operably interconnected by a linearly moveable pump carriage. The first piston pump is operable for maintaining a predetermined inflation pressure in the first tire while the second piston pump is operable for maintaining a predetermined inflation pressure in the second tire. Each of the first and second piston pumps includes a localized recess formed in its pump cylinder bore which creates an entrance pathway for air entering a pump chamber when the piston is positioned at its starting location of stroke travel. Upon movement of the piston beyond this starting location, the localized recess is closed such that air can no longer enter or exit the pump chamber, thereby defining an integral pump inlet valve.

In accordance with another aspect of the present disclosure, the tire inflation apparatus is equipped with the dual pump assembly, wherein each of the first and second piston pumps further includes an exhaust valve configured to prevent release of the pressurized air from the pump chamber until the piston reaches a maximum stroke location whereat a tip end of the piston contacts a release pin of a Schrader-type exhaust valve. Upon depression of the release pin, the Schrader valve opens and the compressed air in the pump chamber is exhausted and supplied to the tire. Specifically, the pressurized air discharged by the Schrader valve is delivered to the inflator valve on the tire via a discharge tube or hose. The Schrader valve closes as the piston retracts from its maximum stroke location back toward its starting location.

In accordance with a still further aspect of the tire inflation apparatus equipped with the dual pump assembly, a speed reduction mechanism is operably disposed between a pump stroke input component and a counterbalance component to facilitate a predetermined relationship between the number of tire rotations and one complete pumping cycle. The speed reduction mechanism may be a planetary gearset. An input member of the planetary gearset is rotatably driven upon rotation of the wheel unit and an output member of the planetary gearset is driven at a reduced speed relative to the input member. The output member is operably coupled by a rotary-to-linear conversion mechanism to the pump carriage of the dual pump assembly and which is operable to convert rotary motion of the output member into translational motion of the pump carriage.

Based on these and other aspects and objectives of the present disclosure, a tire inflation apparatus is provided for maintaining a predetermined inflation pressure of a first tire and a second tire, each tire being mounted on a dual wheel unit of an automotive vehicle, the dual wheel unit being rotatable about a rotary axis. The tire inflation apparatus comprises a pump housing connected to the dual wheel unit for rotation about the rotary axis with the dual wheel unit, and a dual pump assembly including a first pump unit and a second pump unit. The first pump unit includes a first sleeve connected to the pump housing and defining a first pump bore extending along a first linear axis that is transverse to the rotary axis and which extends between a proximal region and a distal region. The first pump unit further defines a first discharge passageway at the distal region of the first pump bore and a first pump rod that is slideably disposed in the first pump bore. The first pump rod has a base end segment facing the proximal region of the first pump bore and a tip end segment facing the distal region of the first pump bore. The first pump rod is linearly slideable in the first pump bore for pressurizing air and for discharging the pressurized air out of the first discharge passageway and into a first inflation valve of the first tire. The second pump unit includes a second sleeve connected to the pump housing and defining a second pump bore extending along a second linear axis that is transverse to the rotary axis which extends between a rearward region and a forward region. The second pump unit further defines a second discharge passageway at the forward region of the second pump bore and a second pump rod that is slideably disposed in the second pump bore. The second pump rod has a base end segment facing the rearward region of the second pump bore and a tip end segment facing the forward region of the second pump bore. The second pump rod is linearly slideable in the second pump bore for pressurizing air in response to movement of the second pump rod and for discharging the pressurized air out of the second discharge passageway and into a second inflation valve of the second tire. The first pump bore extends in spaced and parallel relationship with respect to the second pump bore with the distal region of the first pump bore generally aligned with the frontward region of the second pump bore to space the first and second discharge passageways from one another. The tire inflation apparatus further includes an eccentric drive mechanism having a rotary input being rotatable in response to rotation of the pump housing and a translational output being linearly moveable in response to rotation of the pump housing, and a pump carriage bracket interconnecting the base end segments of the first and second pump rods for linear movement with the translational output of the eccentric drive mechanism, whereby the tip end segments of the pump rods are oriented in opposing directions with respect to one another for providing common linear movement of the first and second pump rods relative to the pump housing. The tire inflation apparatus further including a gearset having an input gear driven by rotation of the pump housing, an output gear driving the rotary input of the eccentric mechanism, and at least one reduction gear for driving the output gear at a reduced speed relative to the input gear.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 3 and 3A illustrate a discharge passageway arrangement associated with each of the first and second pump units of the tire inflation apparatus;

FIG. 5 is a perspective assembled view of the tire inflation apparatus of the present disclosure;

FIG. 5A is a partially cutaway view of the tire inflation apparatus shown in FIG. 5;

FIGS. 7A and 7B are exploded perspective views of a reduction gearset and an eccentric drive mechanism associated with the tire inflation apparatus of the present disclosure;

FIGS. 9 and 9A illustrate a sealing arrangement of an alternative pump unit adapted for use with the dual pump assembly associated with the tire inflation apparatus of the present disclosure.

DETAILED DESCRIPTION OF THE ENABLING EMBODIMENTS

Figure 1:
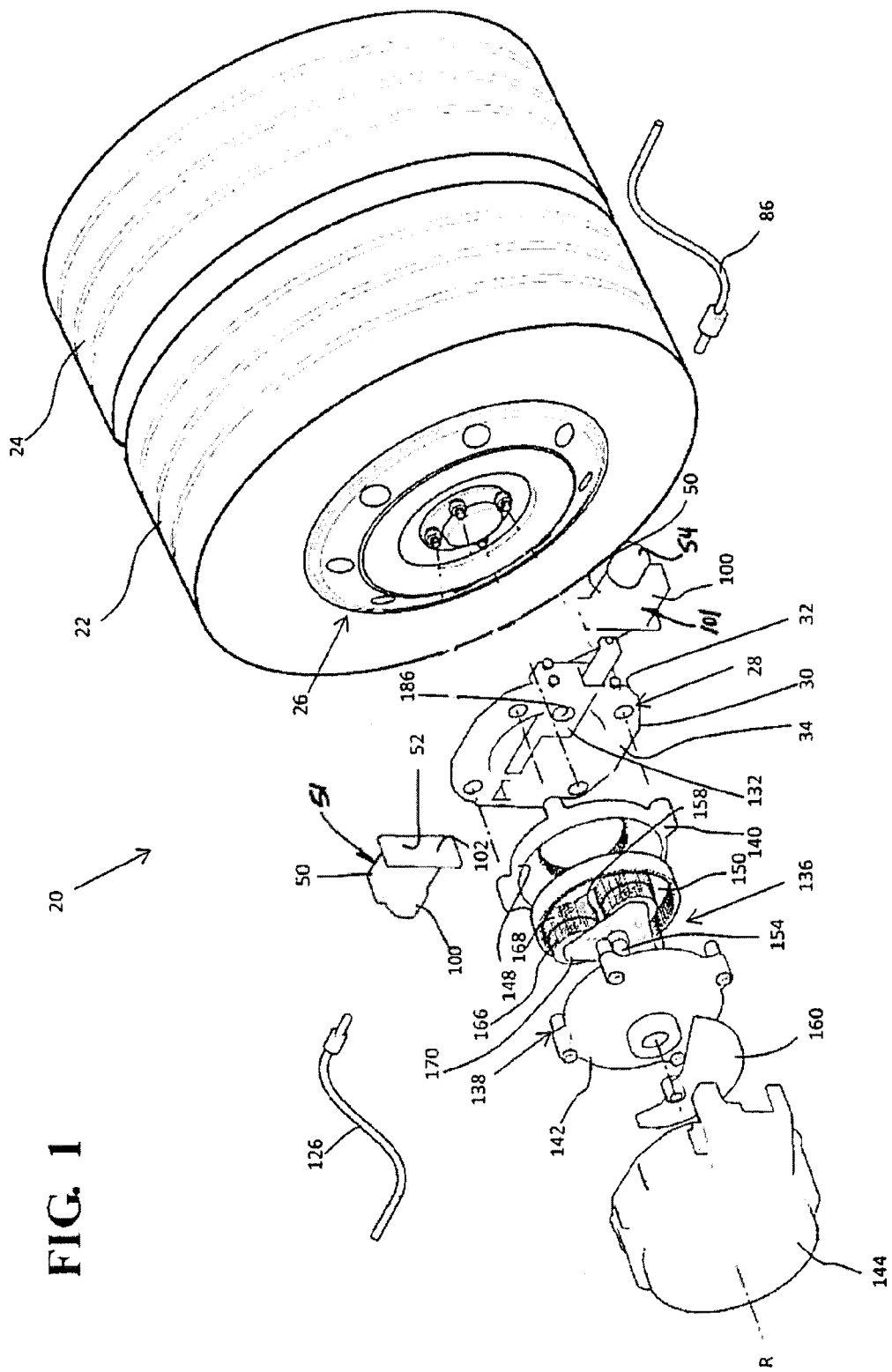
FIG. 1 is an exploded perspective view of a tire inflation apparatus constructed according to the teachings of the present disclosure in association with a dual wheel unit of a motor vehicle.

In general, at least one example embodiment of a tire inflation apparatus constructed in accordance with the teachings of the present disclosure will now be disclosed. The following example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are described in detail.

In general, the present disclosure is directed to a tire inflation apparatus equipped with a dual pump assembly for regulating the inflated pressure of a pair of tires mounted on dual wheel unit. The dual pump assembly is adapted to be mounted for rotation with an outer wheel section of the dual wheel unit and includes a pump housing configured to be attached to the outer wheel section. The dual pump assembly generally includes a first pump unit and a second pump unit. Each of the first and second pump units is a piston pump with a piston installed for reciprocation in a pump chamber of an elongated cylinder bore. The cylinder bore includes at least one recessed inlet area configured to provide an air entry pathway into the pump chamber. The piston is fixed to a pump rod that is retained for sliding movement in a rod guide chamber. Upon movement of a tip end member of the piston out of its start of stroke position toward a maximum stroke position, the recessed inlets are closed to seal the air within the pump chamber, thereby acting as an integral inlet valve and permitting elimination of a conventional inlet check valve. An air filter is provided at an inlet to the pump bore while a sleeve bushing supports the pump rod for sliding movement in the cylinder bore. The components of the second pump unit are generally identical to those of first pump unit, but are arranged in a reversed orientation to accommodate linear sliding movement of both pistons.

The tire inflation apparatus of the present disclosure further includes a pump carriage bracket that is operably arranged to interconnect the first pump rod and the second pump rod for common sliding translational movement relative to the pump housing. A pump stroke input member is retained in a bore formed in the pump carriage bracket and functions in conjunction with an eccentric drive mechanism to convert rotary movement of the dual wheel unit into translational movement of the pump carriage bracket, thereby coordinating movement of each of the first and second pistons between its retracted and extended positions. A reduction gearset is also operably disposed between a counterweight and the eccentric drive mechanism. The gearset is configured to provide a desired speed reduction between its input component and its output component. The input component of the gearset is rotatably driven by the pump housing. The eccentric drive assembly converts rotation of the output component of the gearset into translational movement of the pump carriage bracket. Based on the particular gear components associated with the gearset, a speed reduction ratio is established such that a full pump cycle will require a large number of complete tire rotations.

Referring now to the Figures, wherein like numerals indicate corresponding parts throughout the several views, a tire inflation apparatus 20 is generally shown for maintaining a predetermined inflation pressure of a first tire 22 and a second tire 24, each mounted on a dual wheel unit 26 of an automotive vehicle. The dual wheel unit 26 is rotatable about a rotary axis R.

As best presented in FIG. 1, the tire inflation apparatus 20 includes a pump housing 28. The pump housing 28 includes a skirt section 30 that has a generally square-shaped cross section and defines a first side surface 32 and a second side surface 34. The first side surface 32 of the skirt section 30 is adapted to be fixedly connected to an outer wheel of the dual wheel unit 26 so as to connect the pump housing 28 for common rotation with the dual wheel unit 26. The pump housing 28 may be connected to the dual wheel unit 26 using various connectors including, for example, a mounting bracket (not shown) that is adapted to be secured via suitable fasteners, such as bolts, to a central hub and/or a rim portion of the wheel. Such an arrangement permits the tire inflation apparatus 20 to be easily installed on and removed from the dual wheel unit 26.

Figure 2:
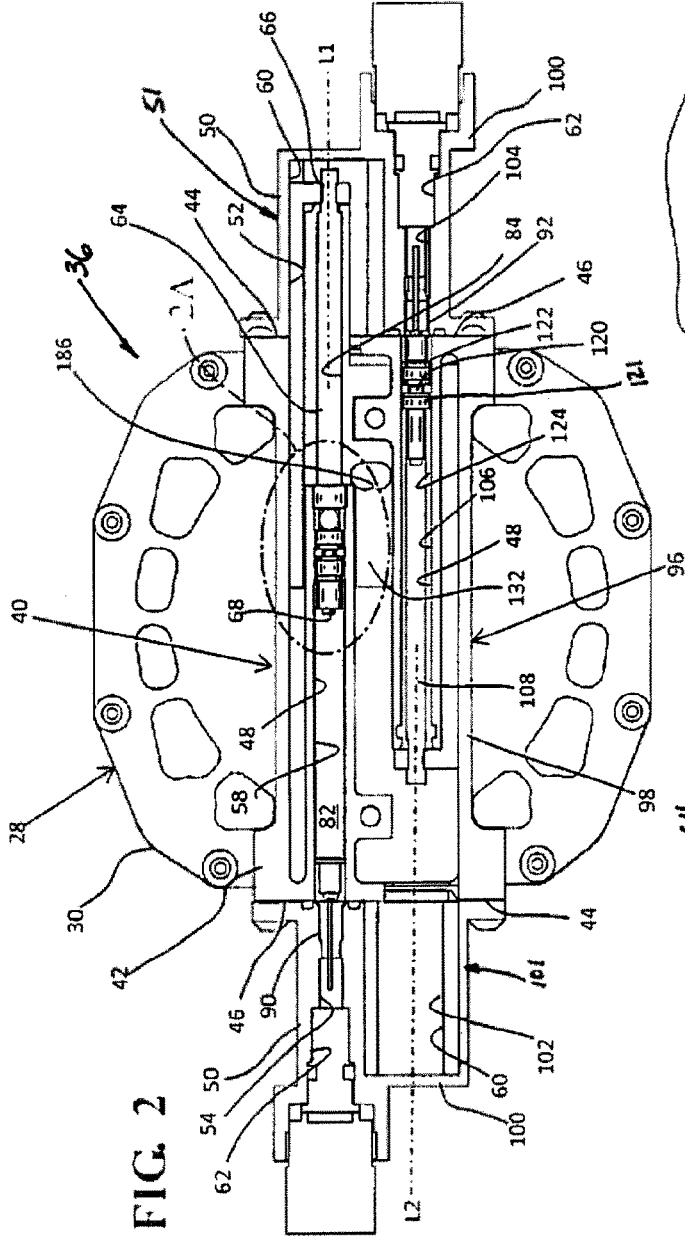
FIG. 2 illustrates first and second pump units of a dual pump assembly associated with the tire inflation apparatus of the present disclosure.

With reference to FIG. 2, a first pump unit 40 of a dual pump assembly 36 is shown to be connected to the skirt section 30 of the pump housing 28. Specifically, the first pump unit 40 includes a first sleeve 42 formed integrally with or fixedly connected to the first side surface 32 of the skirt section 30 of pump housing 28. The first sleeve 42 extends along a first linear axis L1 that is generally perpendicular to the rotary axis R and which extends between a first end 44 and a second end 46. The first sleeve 42 of the first pump unit 40 defines an elongated cylindrical pump bore 48 that extends along the linear axis L1 between the first end 44 and the second end 46.

The pump housing 28 further includes a pair of end caps 50 that are connected to the first and second ends 44, 46 of the first sleeve 42. One of the first end caps 50, referred to as the first inlet end cap, defines a first guide passage 52 that extends along the first linear axis L1 in alignment with the first pump bore 48 of the first sleeve 42. The other of the first end caps 50, referred to as the first discharge end cap, defines a first discharge passageway 54 that extends along the first linear axis L1 in alignment with the first pump bore 48 of the first sleeve 42. The first pump bore 48 of the first sleeve 42, in combination with the first guide passage 52 and first discharge passageway 54 associated with the first end caps 50, define a first guide channel 58. The first guide channel 58 has a proximal region 60 at the first guide passage 52 and a distal region 62 at the first discharge passageway 54.

The first pump unit 40 further includes a first pump rod 64 that is slideably disposed in the first guide channel 58. The first pump rod 64 has a base end segment 66 located in the proximal region 60 of the first guide channel 50 and a tip end segment 68 facing the distal region 62 of the first guide channel 58. The first pump rod 64 is linearly slideable in the first guide channel 58 along the first linear axis L1 for pressurizing air within the first pump bore 48 in response to movement of the first pump rod 64 therein to subsequently control the discharge of the pressurized air out of the first discharge passageway 54 and into a first inflation valve (not shown) of the first tire 22.

Figure 2B:
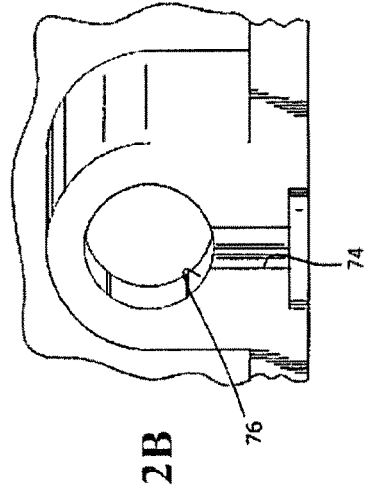
FIGS. 2A and 2B are enlarged partial views taken from FIG. 2 to illustrate an inlet valve arrangement associated with each of the first and second pump units of the tire inflation apparatus.
Figure 2A:
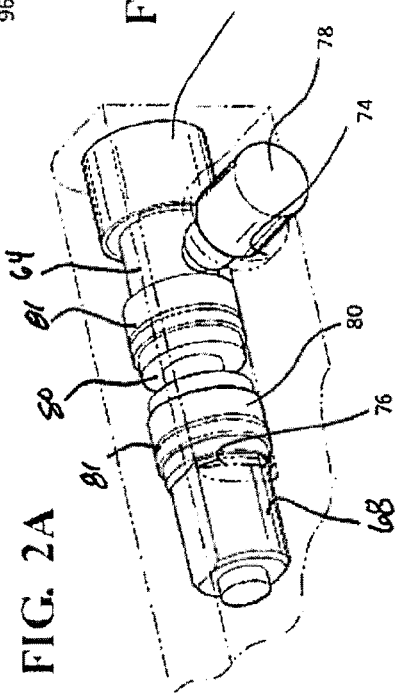

As best shown in FIGS. 2A-2B, the first pump unit 40 further defines a first air inlet 74 that extends radially toward the first linear axis L1 and which is in fluid communication with the first pump bore 48. The first pump bore 48 further includes at least one first recessed inlet segment 76 that extends radially outwardly away from the first linear axis L1. The first air inlet 74 extends into the first recessed inlet segment 76 of the first pump bore 48. The first pump unit 40 further includes a first filter 78 that is disposed in the first air inlet 74 for filtering air that passes through the first air inlet 74 and which permits air, to enter first bore 48 through the recessed inlet segment 76. The first pump unit 40 also includes a first seal 80 and a pair of laterally-spaced first piston rings 81 that separate the first pump bore 48 into a first pump chamber 82 and a first rebound chamber 84. Seal 80 is a Nitrile U-Cup sealing member while pistons 81 are fabricated from an acetyl material to protect seal 80.

The first pump rod 64 is linearly slideable with first pump bore 48 between a "start of stroke" position and a "maximum stroke" position. In the start of stroke position, the first recessed inlet segment 76 of the first pump bore 48 is fluidly connected to the first pump chamber 82. In the maximum stroke position, the first recessed inlet segment 76 is sealed from the first pump chamber 82 by the first seal 80, pistons 81 and the first pump rod 64. Accordingly, this arrangement acts as an integral inlet valve and permits the elimination of a conventional inlet check valve.

Figure 4:
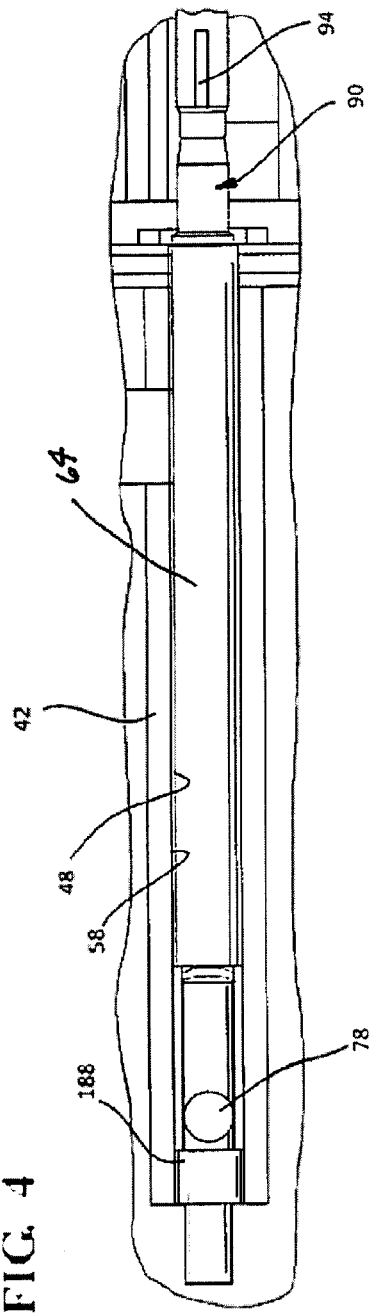
FIGS. 4 and 4A illustrates incorporation of a lost volume arrangement into the pump chamber of each of the pump units associated with the tire inflation apparatus of the present disclosure for regulating the maximum air pressure characteristics.
Figure 4A:
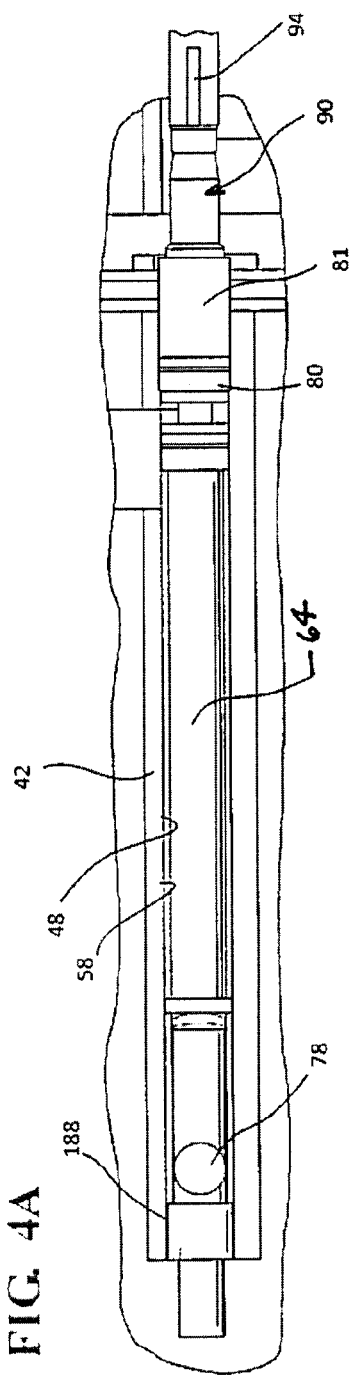

With particular reference to FIGS. 4 and 4A, the maximum pressure that the first pump unit 40 can generate can be regulated by imposing a lost volume within first pump chamber 82. In this way, the maximum pressure is given by the ideal gas law assuming the control volume system moves from an initial uncompressed state (P1, V1) to a final compressed state (P2, V2) where V1>V2.

As best shown in FIG. 1, the first pump unit 40 further includes a first hose 86 that is connected to the first discharge passageway 54 of first end cap 50 and extends to the first inflator valve of the first tire 22. Specifically, the first hose 86 fluidly connects the first discharge passageway 54 of the first pump unit 40 with the first inflator valve of the first tire 22 to allow pressurized air discharged from the first pump chamber 82 to inflate the first tire 22. First hose 86 can include a quick connect-type coupling for connection to first discharge passageway 54 of end cap 50 and/or the first inflator valve.

As best presented in FIGS. 3-3A, the first pump unit 40 further includes a first exhaust valve 90, preferably of the Schrader valve type, that is disposed in the first discharge passageway 54 of the first end cap 50. Other types of exhaust valves could alternatively be used without departing from the scope of the subject disclosure. The first exhaust valve 90 includes a first vent and a first release pin that extend along the first linear axis L1. The first release pin is linearly moveable along the first linear axis L1 between an open position and a closed position and is biased toward the closed position. When the first release pin is in the open position, the first exhaust valve 90 allows pressurized air to pass therethrough from the first pump chamber 82 into discharge passageway 54 for delivery via first hose 86 to the first inflator valve of the first tire 22. In the open position, the tip end segment 68 of the first pump rod 64 is in the maximum stroke position and is in engagement with the first release pin, which opens the first vent. When the first release pin is in the closed position, the first exhaust valve 90 is sealed. In the closed position, the first pump rod 64, is in the start of stroke position and is linearly spaced from the first release pin, which allows the first vent to close.

Referring again to FIG. 2, a second pump unit 96 associated with the dual pump assembly 36 is connected to the skirt segment 30 of the pump housing 28 in a manner substantially similar to that of the first pump unit 40. Specifically, the second pump unit 96 includes a second sleeve 98 that is formed integrally with or fixedly connected to the first side surface 32 of the skirt segment 30 of pump housing 28. The second sleeve 98 extends along a second linear axis L2 that is aligned in spaced and parallel relationship to the first linear axis L1 and defines a first end 44 and a second end 46. The second sleeve 98 of the second pump unit 96 defines a second elongated cylindrical pump bore 48 that extends along the second linear axis L2 between the first and second ends 44, 46.

The pump housing 28 further includes a pair of second end caps 100 that are connected to the first and second ends 44 and 46 of the second sleeve 98. One of the second end caps 100, referred to as the second inlet cap, defines a second guide passage 102 extending along the second linear axis L2 in alignment with the second pump bore 48 of the second sleeve 98. The other one of the second end caps 100, referred to as the second discharge cap, defines a second discharge passageway 104 that extends along the second linear axis L2 in alignment with the pump bore 48 of the second sleeve 98. In the embodiment best shown in FIGS. 1-6, each of the first end caps 50 is formed integrally with one of the second end caps 100. Specifically, the first inlet end cap 50 is integrally formed with the second discharge end cap 100 to define a first end cap unit 51 while the second inlet end cap 100 is integrally formed with the first discharge end cap 50 to define a second end cap unit 101. In actuality, end cap units 51 and 101 are mirror-image components. End cap units 51 and 101 are adapted to be fastened to the ends of the first and second sleeves 42, 98 such as by threaded fasteners. In the embodiment best presented in FIGS. 9-9A, the first and second caps are separate components from one another.

The second pump bore 48 of the second sleeve 98, as well as the second guide passage 102 and the second discharge passageway 104 associated with the second end caps 100, define a second guide channel 106. The second guide channel 106 has a proximal region 60 at the second guide passage 102 and a distal region 62 at the second discharge passageway 104.

The second pump unit 96 further includes a second pump rod 108 that is slideably disposed in the second guide channel 106. The second pump rod 108 has a base end segment 66 that faces the proximal region 60 of the second guide channel 106 and a tip end segment 69 facing the distal region 62 of the second guide channel 106. The second pump rod 108 is linearly slideable in the second pump bore 48 along the second linear axis L2 for pressurizing air in the second pump bore 48 in response to movement of the second pump rod 108 to control the discharge of the pressurized air out of the second discharge passageway 104 and into a second inflation valve of the second tire 24.

The second pump unit 96 defines a second air inlet (not shown) that extends radially toward the second linear axis L2 and is in fluid communication with second pump bore 48. The second pump bore 48 further has at least one second recessed inlet segment (not shown) that extends radially outwardly away from the second linear axis L2. The second air inlet extends into the recessed inlet segment of the second pump bore 48. The second pump unit 96 further includes a second filter (not shown) disposed in the second air inlet for filtering air passing through the second air inlet. The second air inlet and second recessed inlet segment of the second pump unit 96 are configured identically as the first air inlet 74 and the first recessed segment 76 associated with the first pump unit 40.

Like the first pump unit 40, the second pump unit 96 includes a second seal 120 and a pair of laterally-spaced second piston rings 121 that separate the second pump bore 48 into a second pump chamber 122 and a second rebound chamber 124. The second discharge passageway 104 extends into the second pump chamber 122 and the second air inlet extends into the second rebound chamber 124. The second pump rod 108 is linearly slideable between a start of stroke position and a maximum stroke position. In the start of stroke position, the second recessed inlet segment of the second pump bore 48 is fluidly connected to the second pump chamber 122. In the maximum stroke position, the second recessed inlet segment is sealed from the second pump chamber 122 by the second seal 120, piston rings 121 and the second pump rod 108.

As best shown in FIG. 1, the second pump unit 96 further includes a second hose 126 that is adapted to be connected to the second discharge passageway 104 of the second end cap 100 and which extends to the second inflator valve of the second tire 24. The second hose 126 fluidly connects the second discharge passageway 104 of the second pump unit 96 with the second inflator valve of the second tire 24 to allow air from the second pump chamber 122 to inflate the second tire 24.

The second pump unit 96 further includes a second exhaust valve 92 of the Schrader valve type that is disposed in the second discharge passageway 104 of the second end cap 100. Other types of exhaust valves could alternatively be used without departing from the scope of the subject disclosure. The second exhaust valve 92 includes a second vent and a second release pin 130 that extends along the second linear axis L2. The second release pin 130 is linearly moveable along the second linear axis L2 between an open position and a closed position and is biased toward the closed position. When the second release pin 130 is in the open position, the second exhaust valve 92 allows pressurized air to pass therethrough from the second pump chamber 122 into second discharge passageway 104 for delivery via second hose 126 to the second inflator valve 128 of the second tire 24. In the open position, the tip segment 69 of the second pump rod 108 is in the maximum stroke position and is in engagement with the second release pin 130, which opens the second vent. When the second release pin 130 is in the closed position, the second exhaust valve 92 is sealed. In the closed position, the second pump rod 108 is in the start of stroke position and is linearly spaced from the second release pin 130, which allows the second vent to close.

Referring primarily to FIGS. 1-3 and 6, the tire inflation apparatus 20 is shown to further include a pump carriage bracket 132 which is configured to interconnect the base end segments of the first and second pump rods 64, 108 for providing common linear movement of the first and second pump rods 64, 108 relative to the pump housing 28, thereby coordinating movement of the first and second pump rods 64, 108 between their start of stroke and maximum stroke positions. Further, as best presented in FIGS. 7A-8, the tire inflation apparatus 20 also includes an eccentric drive mechanism 134 that is operable for converting rotary movement of the pump housing 28 into the linear movement of the pump carriage bracket 132, thereby causing linearly movement of the first and second pump rods 64, 108. As will be described in more detail, the eccentric drive mechanism 134 includes a rotary input 176 that is rotatable in response to rotation of the housing 28, and a translational output 178 that is linearly moveable parallel to the first and second linear axes L1, L2 for moving linearly in response to rotation of the housing 28.

As best presented in FIGS. 1 and 7A-7B, the tire inflation apparatus 20 further includes a speed reduction mechanism, shown as a gearset 136, that interconnects the pump housing 28 and the eccentric drive mechanism 134 for providing a speed reduction between the rotational movement of the pump housing 28 and the linear movement of the translational output 178 of the eccentric drive mechanism 134. The gearset 136 may include an input gear 162 that is driven by rotation of the pump housing 28, an output gear 164 that drives the rotary input 176 of the eccentric mechanism 134, and a plurality of reduction gears 166, 168 that drive the output gear 164 at a reduced speed relative to the input gear 162. Based on the particular components associated with the gearset 136, a speed reduction ratio is established such that a full pump cycle of the first and second pump rods 64, 108 will require a large number of complete tire rotations. A preferred, but non-limiting, range of speed reduction ratio is about 25:1 to 150:10. Further, because gearset 136 functions to reduce pumping speeds, the accumulated pumping cycles complete for a distance travelled is also reduced. This leads to reduced cyclical wear of the pump components while increasing stroke force for a given weight of a counterweight 160 associated with the gearset 136.

As best presented in FIGS. 1, and 5-7B, the gearset 136 also includes a shell casing 138 having a first case half 140 and a second case half 142 that mate along a plane that extends perpendicularly to the rotary axis R. The first and second case halves 140, 142 each have a generally circular shaped cross section. A plurality of threaded fasteners 143 extend through aligned sets of lugs formed on first case half 140 and second case half 142 for securing shell casing 138 to pump housing 28. The shell casing 138 defines an internal gear chamber within which the gearset 136 is operably disposed. A cover 144 is configured to enclose the shell casing 138 and is also adapted to be connected to the pump housing 28.

The first case half 140 of the shell casing 138 has a first tubular portion that defines an internal ring gear 146 aligned with the rotary axis R. The first case half 140 further includes a second tubular portion 148 that also extends parallel to the rotary axis R toward the second case half 142. A plate 150 is disposed about the rotary axis R within the internal chamber of the shell casing 138 and is aligned for rotation along the rotary axis R within the second tubular portion 148 of the first case half 140. The plate 150 includes an outer perimeter and an annular flange 152 that extends parallel to the rotary axis R toward the second case half 142 of the shell casing 138.

The gearset 136 further includes a central shaft 154 which partially extends inside the shell casing 138 for rotation about the rotary axis R. The gearset 136 also includes a sun gear 158 that is fixedly connected for rotation with the central shaft 154 within the gear chamber. In the preferred embodiments, the rotary input component of the gearset 136 is an input ring gear 162 that is formed within the second case half 142 of the shell casing 138, and the rotary output component of the gearset 136 is an output ring gear 164 that is formed in the annular flange 152 of the plate 150. The input ring gear 162 may have a larger diameter than the output ring gear 164. Further, the reduction gears of the gearset 136 include a plurality of first planet gears 166 that are disposed between and meshed with the sun gear 158 and the input ring gear 162. The reduction gears of the gearset 136 also include a plurality of second planet gears 168 that are each coaxial with and fixedly connected to a corresponding one of the first planet gears 166 and are disposed between and meshed with the output ring gear 164. The first planet gears 166 may also have a larger diameter than the second planet gears 168.

Additionally, the gearset 136 includes a counterweight 160 that is fixedly connected to the central shaft 154 outside of the shell casing 138 and adjacent to the second case half 142 for applying a torque against the central shaft 154 in response to gravity opposing the tendency of the central shaft 154 from rotating in response to rotation of the dual wheel unit 26 and pump housing 28. Said another way, the counterweight 160 opposes motion of the central shaft 154 relative to the dual wheel unit 26 about the rotary axis R. Therefore, the counterweight 160 supports relative motion between the central shaft 154 and the dual wheel unit 26. The gearset 136 further includes a planet carrier unit having a first carrier plate 170 and a second carrier plate 172 that are interconnected and configured to rotatably support aligned sets of the first planet gears 166 and the second planet gears 168 on common pins for rotation about the rotary axis R. A connecting arm 174 extends axially from the plate 150 in spaced and parallel relationship with respect to the rotary axis R.

Figure 8:
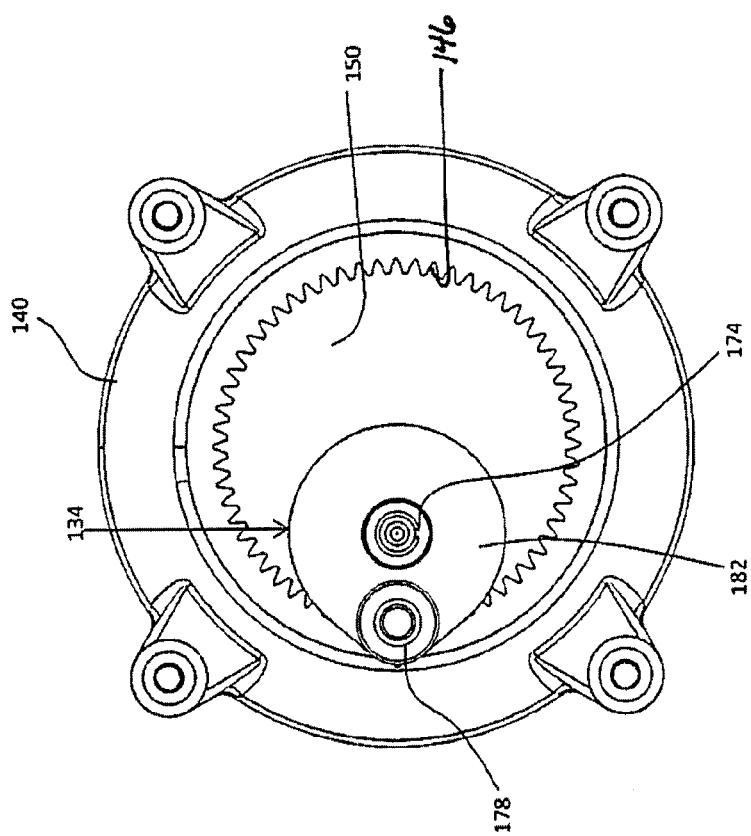
FIG. 8 is a front view of the eccentric drive mechanism associated with the tire inflation apparatus of the present disclosure.

As best presented in FIGS. 7A-8, the eccentric drive mechanism 134 includes a rotary input component 176 that is rotatable in response to rotation of the pump housing 28. The eccentric drive mechanism 134 also includes a translational output component 178 that is linearly moveable in response to rotation of the pump housing 28. In a preferred embodiment, the rotary input component of the eccentric drive mechanism 134 is a drive gear 176 that is rotatably mounted on the connecting arm 174 of the plate 150 and which is meshed with the ring gear 146 formed in first case half 140 of shell casing 138. Thus, the drive gear 176 orbits within the ring gear 146 in response to rotation of the plate 150. The eccentric drive mechanism 134 further includes a platform 182 that overlies and is fixedly connected to drive gear 176. Further, in one preferred embodiment, the translational output component of the eccentric drive mechanism 134 is a pump stroke input member 178 that has a generally cylindrical shape. The pump stroke input member 178 extends from the platform 182 and is spaced radially outwardly from the connecting arm 174. The pump stroke input member 178 slides linearly in response to the drive gear 176 rotating within the ring gear 146 for converting rotary motion of the pump housing 28 into linear motion of the pump carriage bracket 132. In operation, rotation of pump housing 28 due to rotation of wheel unit 26 causes input ring gear 162 to drive first planet gears 166 which is reacted by the sun gear 158 and counterweight 160. Rotation of first planet gears 166 causes concurrent rotation of second planet gears 168 which, in turn, drive output ring gear 164. As such, the rotary speed of plate 150 is reduced relative to the input speed of pump housing 28 and input rings gear 162. Such rotation of plate 150 results in eccentric drive mechanism 134 converting rotation of plate 150 into linear translational movement of the cylindrical pump stroke input member 178.

Figure 6:
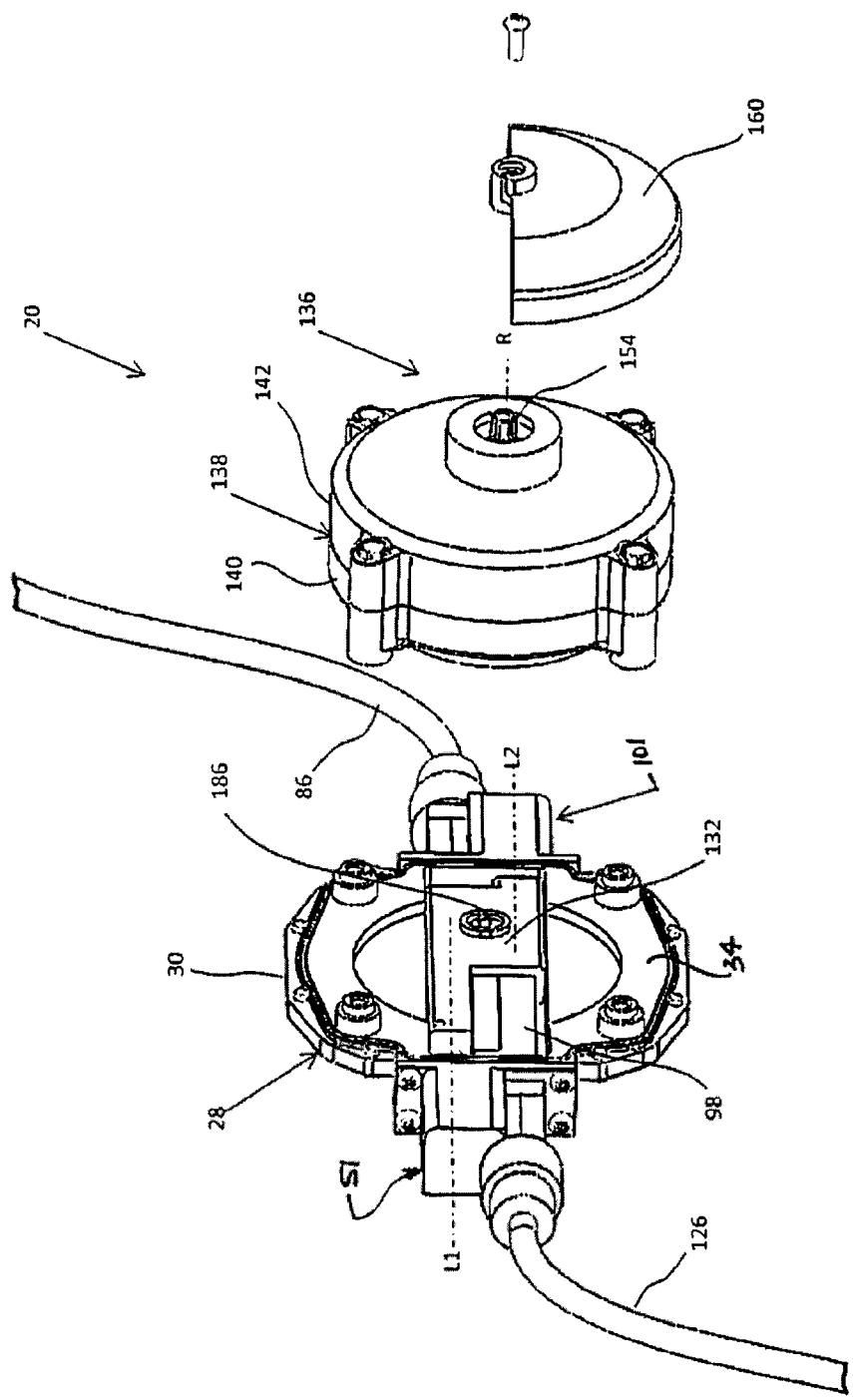
FIG. 6 is an exploded view of the tire inflation apparatus of the present disclosure.

FIGS. 1 and 6 best illustrate that pump carriage bracket 132 is supported for sliding movement within second face surface 34 of pump housing 28 and includes a coupling aperture 186 sized and located to accept and retain the cylindrical pump stroke member 178 of eccentric drive mechanism 134 therein. As such, translational movement of pump stroke member 178 caused by rotation of the dual pump assembly 36 with wheel unit 26 is transferred to pump carriage bracket 132. Pump carriage bracket 132 includes a first connection member 188 coupled to the base end segment 66 of first pump rod 64 and a second connection member 190 coupled to the base end segment 66 of second pump rod 108. The first and second connection members 188, 190 are guided in guide slots 192, 194 formed respectively in first sleeve 42 and second sleeve 98. Connection members 188, 190 are adapted to move into the guide passages in the sleeves in conjunction with the guide slots 192, 194.

Since the tip end segments 68, 69 of the first and second pump rods 64, 108 are pointed in opposing directions and move simultaneously with one another, and because the first and second discharge passageways 54,104 are defined on opposing sides of the first and second guide channels 58, 106 from one another, the pump carriage bracket 132 applies an equal force against the first and second pump rods 64, 108 at all times during linear movement of the first and second pumping rods 64, 108. This ensures even distribution of the pressurized air discharged out of the respective first and second pump units 40, 96 of the dual pump assembly 36 and leads to reduced wear of pump components.

In a first example embodiment of the pump units 40,96, as best presented in FIGS. 2A-4A, the first recessed inlet segment 76 is defined by the first sleeve 42 and the second recessed inlet segment 114 is defined by the second sleeve 98. Additionally, the first seal 80 is mounted on the first pump rod 64 adjacent to the tip end segment 68 of the first pump rod 64 and the second seal 120 is mounted on the second pump rod 108 adjacent to the tip end segment 69 of the second pump rod 108. Furthermore, a first bushing 198 that has a ring shape is disposed in sleeve 42. The first bushing 198 receives the first pump rod 64 for guiding the first pump rod 64 as it slides between its start of stroke and maximum stroke positions. Likewise, a second bushing 198 that has a ring shape is disposed in the second sleeve 98. The second bushing 198 receives the second pump rod 108 for guiding the second pump rod 108 as it slides between its start of stroke and maximum stroke positions.

Another example embodiment of a pump unit 240, configured for use with the dual pump assembly 36 of the tire inflation apparatus 20, is illustrated in FIGS. 9-9A. Those components of pump unit 240 that are similar to those of pump unit 40 are identified by common reference numerals. Thus, a first recessed inlet segment 276 is now defined by an inlet end cap 250. Further, a first seal 280 is sandwiched between a first sleeve 242 and the inlet cap 250 for receiving the first pump rod 64. Furthermore, a first air inlet 274 is defined by the inlet end cap 250. In this embodiment, the first seal 280 is stationary as opposed to being positioned for movement with the pump rod 64, which advantageously provides for a simpler pump unit 240 and also alleviates the tight surface finish requirements of the guide channels. Additionally, the air inlets 274 are in a simplified, accessible location. The Schrader valve 90 is shown located in an exhaust end cap 252 connected to the opposite end of tube 242. Thus, the pump housing is now a three-piece arrangement.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A tire inflation apparatus for maintaining a predetermined inflation pressure of a first tire and a second tire each mounted on a dual wheel unit of an automotive vehicle, the dual wheel unit being rotatable about a rotary axis, said tire inflation apparatus comprising;
   a housing fixed for rotation with the dual wheel unit about the rotary axis;
   a first pump unit connected to said housing and defining a first pump bore extending along a first linear axis that is transverse to the rotary axis, said first pump bore extending between a proximal region and a distal region, said first pump unit defining a first discharge passageway at said distal region of said first pump bore, said first pump unit including a first pump rod disposed in said first pump bore and including a base end segment facing said proximal region of said first pump bore and a tip end segment facing said distal region of said first pump bore, said first pump rod linearly slideable in said first pump bore for pressurizing air in response to movement of said first pump rod and to control the discharge of pressurized air out of said first discharge passageway and into a first inflation valve of the first tire;

a second pump unit connected to said housing and defining a second pump bore extending along a second linear axis that is transverse to the rotary axis, said second pump bore extending between a rearward region and a forward region, said second pump unit defining a second discharge passageway at said forward region of said second pump bore, said second pump unit including a second pump rod disposed in said second pump bore and including a base end segment facing said rearward region of said second pump bore and a tip end segment facing said forward region of said second pump bore, said second pump rod linearly slideable in said second pump bore for pressurizing air in response to movement of said second pump rod and to control the discharge of pressurized air out of said second discharge passageway and into a second inflation valve of the second tire;

an eccentric drive mechanism including a rotary input component being rotatable in response to rotation of said housing, and a translational output component being linearly moveable parallel to said first linear axis for moving linearly in response to rotation of said housing;

a pump carriage bracket interconnecting said base end segments of said first and second pump rods to said translational output component of said eccentric drive mechanism for providing common linear movement of said first and second pump rods relative to said housing; and a gearset interconnecting said housing and said rotary input component of said eccentric drive mechanism, said gearset including an input gear driven by rotation of said housing, an output gear driving said rotary input component of said eccentric mechanism, and at least one reduction gear for driving said output gear at a reduced speed relative to said input gear.

2. The tire inflation apparatus as set forth in claim 1 wherein said input gear includes an input ring gear disposed about said rotary axis and rotatable with said housing about said rotary axis.

3. The tire inflation apparatus as set forth in claim 2 wherein said gearset further includes a central shaft and a sun gear fixedly connected to said central shaft for rotation about said rotary axis.

4. The tire inflation apparatus as set forth in claim 3 wherein said at least one reduction gear includes a plurality of first planet gears disposed between and meshed with said sun gear and said input ring gear.

5. The tire inflation apparatus as set forth in claim 4 wherein said gearset further includes a counterweight fixedly connected to said central shaft for applying a torque against said central shaft gear in response to gravity opposing the tendency of said central shaft and said sun gear from rotating in response to rotation of the dual wheel unit.

6. The tire inflation apparatus as set forth in claim 5 wherein said output gear of said gearset includes an output ring gear spaced along said rotary axis from said input ring gear.

7. The tire inflation apparatus as set forth in claim 6 wherein said gearset further includes a plate disposed about said rotary axis and spaced from said input ring gear, wherein said plate includes an outer perimeter and an annular flange extending parallel to said rotary axis at said outer perimeter, and wherein said output ring gear is formed on said annular flange of said plate.

8. The tire inflation apparatus as set forth in claim 7 wherein said at least one reduction gear further includes a plurality of second planet gears each being coaxial with and fixedly connected to one of said first planet gears and disposed between and meshed with said output ring gear, wherein said gearset further includes a planet carrier rotatably supporting said first and second planet gears.

9. The tire inflation apparatus as set forth in claim 8 further including an inside ring gear spaced along said rotary axis from said output ring gear and rotatable with said housing about said rotary axis.

10. The tire inflation apparatus as set forth in claim 9 further including a connecting arm extending from said plate in spaced and parallel relationship with respect to said rotary axis, and wherein said connecting arm is connected with said rotary input component of said eccentric drive mechanism.

11. The tire inflation apparatus as set forth in claim 10 wherein said rotary input component of said eccentric drive mechanism includes a drive gear rotatably connected with said connecting arm and meshing with said inside ring gear for rotation within said inside ring gear in response to rotation of said plate about said rotary axis, wherein said eccentric drive mechanism further includes a platform overlying and fixedly connected with said drive gear for rotation with said drive gear, and wherein said output component of said eccentric drive mechanism includes a pump stroke input member extending from said platform and spaced radially outwardly from said connecting arm being and connected to said pump carriage bracket for sliding linearly in response to said drive gear rotating within said inside ring gear, whereby rotary motion of said housing is converted into linear motion of said pump carriage bracket.

12. The tire inflation apparatus as set forth in claim 1 wherein said first pump bore has a first recessed inlet segment extending radially outwardly away from said first linear axis, said second pump bore has a second recessed inlet segment extending radially outwardly away from said second linear axis, said first pump unit defines a first air inlet extending radially inwardly into communication with said first recessed inlet segment, and said second pump unit defines a second air inlet extending radially inwardly into communication with said second recessed inlet segment.

13. The tire inflation apparatus as set forth in claim 12 wherein said first pump unit further includes a first seal separating said first pump bore into a first pump chamber and a first rebound chamber with said first discharge passageway extending into said first pump chamber and said first air inlet extending into said first rebound chamber, wherein said second pump unit further includes a second seal separating said second pump bore into a second pump chamber and a second rebound chamber with said second discharge passageway extending into said second pump chamber and said second air inlet extending into said second rebound chamber, wherein said first pump rod is linearly slideable between a start of stroke position and a maximum stroke position, wherein said first recessed inlet segment of said first pump bore is fluidly connected to said first pump chamber when said first pump rod is in said start of stroke position, and wherein said first recessed inlet segment is sealed from said first pump chamber by said first seal and said first pump rod when said first pump rod is in said maximum stroke position, wherein said second pump rod is linearly slideable between a start of stroke position and a maximum stroke position, wherein said second recessed inlet segment of said second pump bore is fluidly connected to said second pump chamber when said second pump rod is in said start of stroke position, and wherein said second recessed inlet segment is sealed from said first pump chamber by said second seal and second first pump rod when said second pump rod is in said maximum stroke position.

14. The tire inflation apparatus as set forth in claim 13 wherein said first recessed inlet segment is defined by a first sleeve, said second recessed inlet segment is defined by a second sleeve, said first seal being disposed about said first pump rod adjacent to said tip end segment of said first pump rod, said second seal being disposed about said second pump rod adjacent to said tip end segment of said second pump rod, a first bushing being disposed in said first sleeve and receiving said first pump rod for guiding said first pump rod as said first pump rod slides between said start of stroke and maximum stroke positions, and a second bushing being disposed in said second sleeve and receiving said second pump rod for guiding said second pump rod as said second pump rod slides between said start of stroke and maximum stroke positions.

15. The tire inflation apparatus as set forth in claim 13 wherein said first recessed inlet segment is defined by a first end cap and said second recessed inlet segment defined by a second end cap, wherein said first air inlet is defined by said first end cap and said second air inlet defined by said second end cap, and wherein said first seal is sandwiched between said first sleeve and said first end cap for receiving said first pump rod and said second seal is sandwiched between said second sleeve and said second end cap for receiving said second pump rod.

16. The tire inflation apparatus as set forth in claim 13 wherein said first pump unit further includes an exhaust valve disposed in said first discharge passageway, and wherein said second pump unit further includes an exhaust valve disposed in said second discharge passageway.

17. The tire inflation apparatus as set forth in claim 16 wherein said first exhaust valve includes a first vent and a first release pin extending along said first linear axis and linearly moveable between an open position opening said first vent with said first tip segment of said first pump rod in engagement with said first release pin when said first pump rod is in said maximum stroke position and a closed position closing said first vent with said first pump rod being linearly spaced from said first release pin when said first pump rod is in said start of stroke position and wherein said first valve allows air to pass therethrough from said first pump chamber to the first inflator valve of the first tire when said first valve is in said open position and wherein said first valve is sealed when said first valve is in said closed position, and wherein said second exhaust valve includes a second vent and a second release pin extending along said second linear axis and linearly moveable between an open position opening said second vent with said second tip segment of said second pump rod in engagement with said second release pin when said second pump rod is in said maximum stroke position and a closed position closing said second vent with said second pump rod being linearly spaced from said second release pin when said second pump rod is in said start of stroke position and wherein said second valve allows air to pass therethrough from said second pump chamber to the second inflator valve of the second tire when said second valve is in said open position and wherein said second valve is sealed when said second valve is in said closed position.

18. The tire inflation apparatus as set forth in claim 1 further including a first hose connected to said first discharge passageway and extending to the first inflator valve of the first tire for fluidly connecting said first discharge passageway of said first pump unit with the inflator valve of the first tire to allow pressurized air from said first pump chamber to inflate the first tire, and a second hose connected to said second discharge passageway and extending to the second inflator valve of the second tire for fluidly connecting said second discharge passageway of said second pump unit with the inflator valve of the second tire to allow pressurized air from said second pump chamber to inflate the second tire.

19. A tire inflation system for maintaining a predetermined tire inflation pressure of a first tire and a second tire mounted on a dual wheel unit of a vehicle, the wheel unit being rotatable about an axis of rotation, the tire inflation system comprising:
a housing having a mounting structure for engaging a complementary mounting structure of the wheel unit;
a dual pump assembly including a first pump unit, a second pump unit, a rotary to linear conversion drive mechanism, and a speed reduction mechanism, said first pump unit defining a first pump chamber, a first piston slideably disposed in said first pump chamber, a first air inlet port for taking air into said first pump chamber, and a first outlet port for discharging pressurized air out of said first pump chamber, said second pump unit defining a second pump chamber, a second piston slideably disposed in said second pump chamber, a second air inlet port for taking air into said second pump chamber, and a second outlet port for discharging pressurized air out of said second pump chamber, said rotary to linear conversion drive mechanism including a pump carriage bracket interconnecting said first piston and said second piston for common translational movement relative to said housing, a rotary input, a translational output coupled to said pump carriage bracket, and a device for converting rotational motion of said rotary input into translational movement of said translational output, said speed reduction unit including an input gear driven by rotation of the wheel unit, and output gear driving said rotary input of said rotary to linear conversion drive mechanism, and a reduction gear for driving said output gear at a reduced speed relative to said input gear;
a first hose disposed between said first outlet port and a first inflation valve of the first tire; and
a second hose disposed between said second air outlet port and a second inflation valve of the second tire.

20. The tire inflation system of claim 19 wherein said rotary to linear conversion drive mechanism includes an eccentric drive assembly operably disposed between said rotary input and said translational output.

* * * * *